United States Patent
Kan et al.

(10) Patent No.: US 12,487,960 B2
(45) Date of Patent: Dec. 2, 2025

(54) COMMUNICATION METHOD AND SYSTEM FOR DISTRIBUTED HETEROGENEOUS ACCELERATION PLATFORM, DEVICE AND MEDIUM

(71) Applicant: SUZHOU METABRAIN INTELLIGENT TECHNOLOGY CO., LTD., Jiangsu (CN)

(72) Inventors: Hongwei Kan, Jiangsu (CN); Rengang Li, Jiangsu (CN); Yanwei Wang, Jiangsu (CN); Rui Hao, Jiangsu (CN); Jiangwei Wang, Jiangsu (CN); Dongdong Su, Jiangsu (CN); Kefeng Zhu, Jiangsu (CN); Le Yang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/571,192

(22) PCT Filed: Jun. 1, 2022

(86) PCT No.: PCT/CN2022/096537
§ 371 (c)(1),
(2) Date: Dec. 15, 2023

(87) PCT Pub. No.: WO2023/103301
PCT Pub. Date: Jun. 15, 2023

(65) Prior Publication Data
US 2024/0281400 A1   Aug. 22, 2024

(30) Foreign Application Priority Data
Dec. 9, 2021   (CN) .......................... 202111495314.X (51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC .................... G06F 13/4221; G06F 2213/0026
(Continued)

(56) References Cited

U.S. PATENT DOCUMENTS

| | | | |
|---|---|---|---|
| 10,945,309 B2 * | 3/2021 | Kondapalli | ............. H04L 67/60 |
| 10,977,018 B1 | 4/2021 | Hwang | |

(Continued)

FOREIGN PATENT DOCUMENTS

| | | | |
|---|---|---|---|
| CN | 104657330 A | 5/2015 | |
| CN | 108776648 A | 11/2018 | |

(Continued)

OTHER PUBLICATIONS

International Search Report and Written Opinion for International Patent Appl. No. PCT/CN2022/096537 mailed Jul. 27, 2022, 9 pgs.

(Continued)

*Primary Examiner* — Christopher B Shin
(74) *Attorney, Agent, or Firm* — Merchant & Gould P.C.

(57) ABSTRACT

Provided are a communication method and system for a distributed heterogeneous acceleration platform, a device and a medium. The method includes: after starting a collaborative acceleration task, determining, by a first target heterogeneous acceleration card in a distributed heterogeneous acceleration platform, a second target heterogeneous acceleration card from the distributed heterogeneous acceleration platform by querying an information table corresponding to the collaborative acceleration task; generating, by the first target heterogeneous acceleration card, a target data packet according to a predefined data packet format, and sending the target data packet to the second target heterogeneous acceleration card via a PCIE interface; and parsing, by the
(Continued)

second target heterogeneous acceleration card, the target data packet according to the data packet format, and executing a corresponding read operation or write operation according to a parsing result, so as to complete the collaborative acceleration task.

20 Claims, 3 Drawing Sheets

(58) Field of Classification Search
USPC .......................................................... 710/105
See application file for complete search history.

(56) References Cited

U.S. PATENT DOCUMENTS

| | | | |
|---|---|---|---|
| 12,066,964 B1* | 8/2024 | Urjan Anandakumar | ................... G06F 13/4022 |
| 2020/0218684 A1* | 7/2020 | Sen | ..................... G06F 13/4027 |
| 2023/0153159 A1* | 5/2023 | Kelkar | .................. G06F 9/4856 718/105 |
| 2023/0305980 A1 | 9/2023 | Wei | |
| 2024/0045824 A1* | 2/2024 | Wang | ................... G06F 15/7867 |
| 2025/0219896 A1* | 7/2025 | Hong | .................... H04L 47/624 |

FOREIGN PATENT DOCUMENTS

| | | |
|---|---|---|
| CN | 110781129 A | 2/2020 |
| CN | 111966189 A | 11/2020 |
| CN | 112416840 A | 2/2021 |
| CN | 113900982 A | 1/2022 |

OTHER PUBLICATIONS

Chinese Search Report for Chinese Patent Application No. 202111495314X dated Jan. 11, 2022, 2 pgs.

* cited by examiner

COMMUNICATION METHOD AND SYSTEM FOR DISTRIBUTED HETEROGENEOUS ACCELERATION PLATFORM, DEVICE AND MEDIUM

CROSS-REFERENCE TO RELATED APPLICATIONS

This application is a National Stage Filing of the PCT International Application No. PCT/CN2022/096537 filed on Jun. 1, 2022, which claims priority to China Patent Application No. 202111495314.X, filed on Dec. 9, 2021, both applications of which are hereby incorporated by reference in their entirety.

TECHNICAL FIELD

The present disclosure relates to the technical field of computers, and in particular, to a communication method and system for a distributed heterogeneous acceleration platform, a device and a medium.

BACKGROUND

At present, heterogeneous acceleration cards are greatly used in a data center, for example, a field programmable gate array (FPGA) heterogeneous acceleration card is provided with a standard peripheral component interconnect express (PCIE, a high speed serial computer expansion bus standard) interface, and a 10G or 100G network interface, for constructing a distributed heterogeneous acceleration platform. In applications such as artificial intelligence and high-performance heterogeneous acceleration applications, multiple accelerator board cards are often needed to implement one heterogeneous acceleration task collaboratively by means of division of work, and therefore, communication and data transmission between different FPGA acceleration cards are particularly important. The inventor realizes that in the prior art, data transmission between different acceleration cards is usually performed by means of network interfaces; however, use of network interfaces has problems such as large data transmission delay and network packet loss, and is not applicable to all scenarios. Currently, PCIE interfaces of various types of acceleration cards are mostly used for performing data interaction with a Host, and a physically independent high-speed customized bus is used between board cards. With regard to how to use PCIE interfaces to perform data interaction and communication between different FPGA acceleration cards in a heterogeneous acceleration platform, it currently stays at a stage of an architectural solution in which a CPU is used as a main transfer, thereby reducing the efficiency of data transmission between heterogeneous acceleration cards.

SUMMARY

Provided in the present disclosure are a communication method and system for a distributed heterogeneous acceleration platform, a device and a medium. The specific solution is as follows:
according to a first aspect, the present disclosure provides a communication method for a distributed heterogeneous acceleration platform, including:
after starting a collaborative acceleration task, a second target heterogeneous acceleration card is determined, by a first target heterogeneous acceleration card in a distributed heterogeneous acceleration platform, from the distributed heterogeneous acceleration platform by querying an information table corresponding to the collaborative acceleration task;
a target data packet is generated, by the first target heterogeneous acceleration card, according to a predefined data packet format, and the target data packet is sent to the second target heterogeneous acceleration card via a PCIE interface; and
the target data packet is parsed, by the second target heterogeneous acceleration card, according to the data packet format, and a corresponding read operation or write operation is executed according to a parsing result, so as to complete the collaborative acceleration task.

In some embodiments, before a second target heterogeneous acceleration card is determined, by a first target heterogeneous acceleration card in a distributed heterogeneous acceleration platform, from the distributed heterogeneous acceleration platform by querying an information table corresponding to the collaborative acceleration task, the method further includes: a respective information table is configured for each heterogeneous acceleration card in the distributed heterogeneous acceleration platform according to task information corresponding to the collaborative acceleration task, wherein the information table comprises a board card lookup table and a collaborative acceleration parameter table; and after the information table is configured, a collaborative acceleration task startup command is initiated to the distributed heterogeneous acceleration platform.

In some embodiments, the step that a board card lookup table is configured for each heterogeneous acceleration card in the distributed heterogeneous acceleration platform includes:
identity information allocated by a PCIE system to each heterogeneous acceleration card is acquired, wherein the identity information includes a bus number, a device number and a function number;
a unique identification number is set for each heterogeneous acceleration card in the distributed heterogeneous acceleration platform, and parameter information corresponding to each heterogeneous acceleration card is obtained on the basis of the identity information and the unique identification number; and
the board card lookup table is configured for each heterogeneous acceleration card on the basis of the parameter information corresponding to all heterogeneous acceleration cards.

In some embodiments, the step that a collaborative acceleration parameter table is configured for each heterogeneous acceleration card in the distributed heterogeneous acceleration platform includes:
a corresponding collaborative acceleration information table is configured for the heterogeneous acceleration card according to task information corresponding to the collaborative acceleration task, wherein the collaborative acceleration information table includes participation information corresponding to the current collaborative acceleration task, startup information and a unique identification number of an associated heterogeneous acceleration card.

In some embodiments, the step that a target data packet is generated according to a predefined data packet format includes:
packetizing is performed according to a processing layer data packet format of PCIE, and payload fields in the processing layer data packet format are filled according to the predefined data packet format to configure a source ID field, a target ID field, an operation type field, an operation address field, a data size field and a data field, so as to obtain the target data packet;

wherein the source ID field is used for storing a unique identification number of the first target heterogeneous acceleration card, the target ID field is used for storing a unique identification number of the second target heterogeneous acceleration card, and the operation type includes a read operation and a write operation.

In some embodiments, the step that the target data packet is parsed according to the data packet format, and a corresponding read operation or write operation is executed according to a parsing result includes:

the payload fields of the target data packet are parsed according to the data packet format;

when parameter information stored in the target ID field in the payload fields is consistent with a local unique identification number, an operation type corresponding to the operation type field in the payload fields is determined; and according to the operation address field, the data size field and the data field in the payload fields, a corresponding operation is executed according to an operation mode corresponding to the operation type.

In some embodiments, the step that according to the operation address field, the data size field and the data field in the payload fields, a corresponding operation is executed according to an operation mode corresponding to the operation type includes:

when the operation type is a write operation, a first starting address of write is determined according to the operation address field, a first data length is determined according to the data size field, and then the content contained in the data field is written locally according to the first starting address and the first data length; and when the operation type is a read operation, a second starting address of read is determined according to the operation address field, a second data length is determined according to the data size field, then locally corresponding data is read according to the second starting address and the second data length to generate a processing layer data packet, and the processing layer data packet is sent to the first target heterogeneous acceleration card.

According to a second aspect, the present disclosure provides a communication system for a distributed heterogeneous acceleration platform, comprising:

a first target heterogeneous acceleration card, configured to determine a second target heterogeneous acceleration card from a distributed heterogeneous acceleration platform by querying an information table corresponding to a collaborative acceleration task after starting the collaborative acceleration task, generate a target data packet according to a predefined data packet format, and send the target data packet to the second target heterogeneous acceleration card via a PCIE interface; and the second target heterogeneous acceleration card, configured to parse the target data packet according to the data packet format, and execute a corresponding read operation or write operation according to a parsing result, so as to complete the collaborative acceleration task.

According to a third aspect, the present disclosure provides a computer device, comprising a memory and one or more processors, wherein the memory stores computer readable instructions which, when executed by the processors, cause the one or more processors to execute the steps of the communication method for a distributed heterogeneous acceleration platform according to any one of the described embodiments.

In some embodiments, the present disclosure further provides one or more non-volatile storage media storing computer readable instructions which, when executed by one or more processors, cause the one or more processors to execute the steps of the communication method for a distributed heterogeneous acceleration platform according to any one of the described embodiments.

Details of one or more embodiments of the present disclosure are set forth in the drawings and the description below. Other features and advantages of the present disclosure will become apparent from the description, the drawings, and the claims.

BRIEF DESCRIPTION OF THE DRAWINGS

To describe the technical solutions in the embodiments of the present disclosure or in the prior art more clearly, the following briefly introduces the drawings required for description in the embodiments or the prior art. Apparently, the drawings in the following description show merely some embodiments of the present disclosure, and a person of ordinary skill in the art may still derive other drawings from the provided drawings without inventive efforts.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the drawings in the embodiments of the present disclosure. Apparently, the described embodiments are merely some rather than all of the embodiments of the present disclosure. All other embodiments obtained by a person of ordinary skill in the art based on the embodiments of the present disclosure without inventive efforts shall belong to the scope of protection of the present disclosure.

In the conventional art, data transmission between different acceleration cards is usually performed by means of network interfaces; however, use of network interfaces has problems such as large data transmission delay and network packet loss. In order to overcome the described technical problems, the present disclosure provides a communication method for a distributed heterogeneous acceleration platform, which can realize autonomous data communication between multiple heterogeneous acceleration cards, and improve the capability of distributed heterogeneous acceleration computing.

Figure 1:
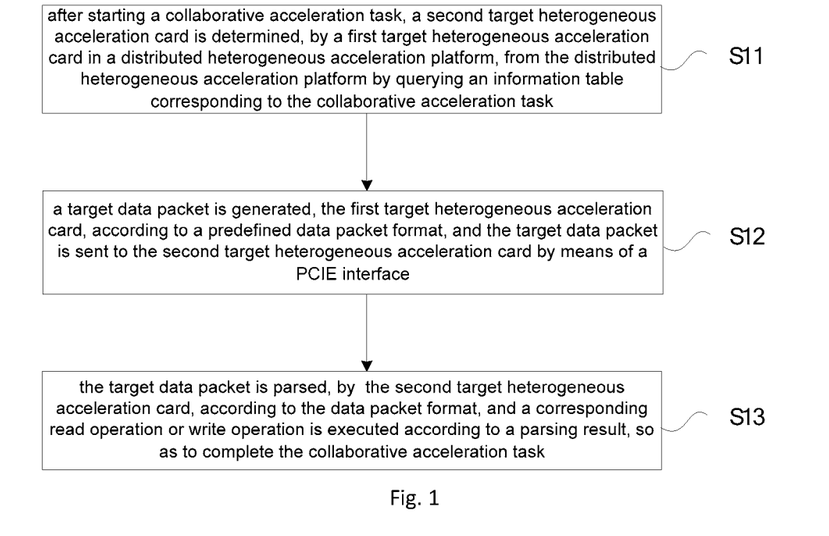
FIG. 1 is a flowchart of a communication method for a distributed heterogeneous acceleration platform according to one or more embodiments.

Provided in the embodiments of the present disclosure is a communication method for a distributed heterogeneous acceleration platform. As shown in FIG. 1, the method may includes the following steps:

step S11: after starting a collaborative acceleration task, a second target heterogeneous acceleration card is determined, by a first target heterogeneous acceleration card in a distributed heterogeneous acceleration platform, from the distributed heterogeneous acceleration platform by querying an information table corresponding to the collaborative acceleration task.

In this embodiment, after a collaborative acceleration task is initiated to a distributed heterogeneous acceleration platform, a second target heterogeneous acceleration card is determined, by a first target heterogeneous acceleration card in the distributed heterogeneous acceleration platform, from the distributed heterogeneous acceleration platform by querying an information table corresponding to the collaborative acceleration task. It can be understood that, the first target heterogeneous acceleration card and the second target heterogeneous acceleration card are general references to multiple heterogeneous acceleration cards in a distributed heterogeneous acceleration platform, the first target heterogeneous acceleration card is a sending end for single data transmission, and the second target heterogeneous acceleration card is a corresponding receiving end. The information table may be pre-stored in the first target heterogeneous acceleration card, and may also be pre-stored in a public database for all heterogeneous acceleration cards in the distributed heterogeneous acceleration platform.

In this embodiment, before a second target heterogeneous acceleration card is determined, by a first target heterogeneous acceleration card in a distributed heterogeneous acceleration platform, from the distributed heterogeneous acceleration platform by querying an information table corresponding to the collaborative acceleration task, the method may further include: a respective information table is configured for each heterogeneous acceleration card in the distributed heterogeneous acceleration platform according to task information corresponding to the collaborative acceleration task, wherein the information table comprises a board card lookup table and a collaborative acceleration parameter table; after the information table is configured, a collaborative acceleration task startup command is initiated to the distributed heterogeneous acceleration platform. Namely, before starting a collaborative acceleration task, a respective information table is configured for each heterogeneous acceleration card in the distributed heterogeneous acceleration platform according to task information corresponding to the collaborative acceleration task, wherein the information table comprises a board card lookup table and a collaborative acceleration parameter table, the board card lookup table stores parameter information of all the heterogeneous acceleration cards in the distributed heterogeneous acceleration platform, and the collaborative acceleration parameter table stores association information corresponding to the collaborative acceleration task.

In this embodiment, the step that a board card lookup table is configured for each heterogeneous acceleration card in the distributed heterogeneous acceleration platform may comprise: identity information allocated by a PCIE system to each heterogeneous acceleration card is acquired, wherein the identity information comprises a bus number, a device number and a function number; a unique identification number is set for each heterogeneous acceleration card in the distributed heterogeneous acceleration platform, and parameter information corresponding to each heterogeneous acceleration card is obtained on the basis of the identity information and the unique identification number; and the board card lookup table is configured for each heterogeneous acceleration card on the basis of the parameter information corresponding to all heterogeneous acceleration cards. It can be understood that, according to the PCIE protocol, when being powered on and initialized, a PCIE system allocates identity information (BDF information) to each heterogeneous acceleration card in the system, wherein the identity information comprises a bus number (bus), a device number (device) and a function number (Function). Thus, the host end acquires the identity information allocated by the PCIE system to each heterogeneous acceleration card, sets an identification number for each heterogeneous acceleration card in the system, and records same as ID information of the card. ID information, which is used for identity identification of a heterogeneous acceleration card, may be implemented in a manner of accumulating 1 from 0, but needs to be unique in the current distributed heterogeneous acceleration platform.

In this embodiment, the step that a collaborative acceleration parameter table is configured for each heterogeneous acceleration card in the distributed heterogeneous acceleration platform may comprise: a corresponding collaborative acceleration information table is configured for the heterogeneous acceleration card according to task information corresponding to the collaborative acceleration task, wherein the collaborative acceleration information table comprises participation information corresponding to the current collaborative acceleration task, startup information and a unique identification number of an associated heterogeneous acceleration card. Namely, a collaborative acceleration information table is used for recording whether the present acceleration card participates in the current collaborative heterogeneous acceleration, startup information, and ID information of the next board card to which data is transmitted after the local heterogeneous acceleration operation of the present card is completed. The collaborative acceleration information table is composed of Enable, Start and IDs. In participation information (Enable), (Start), and a unique identification number (IDs) of an associated heterogeneous acceleration card, Enable represents participation information, indicating that the present card needs to participate in the current collaborative heterogeneous acceleration, wherein 0/1 may be used to indicate, 0 indicates that no response is needed; Start represents startup information, indicating that the current collaborative acceleration operation of the present card is started, and the present card begins to participate in the acceleration action (for example, operations such as computing); and ID is a unique identification number of an associated heterogeneous acceleration card, including but not limited to an ID of one heterogeneous acceleration card, indicating that a local acceleration operation result of the present card needs to be transferred to a next heterogeneous acceleration card, and a subsequent heterogeneous acceleration action is continuously performed. It should be noted that, the startup operation of the collaborative acceleration task and the configuration operation of the information table may be specifically performed by the host end where the platform is located, and may also be performed by the other host end by means of a network.

The heterogeneous acceleration card may be an FPGA heterogeneous acceleration card, a graphics processing unit (GPU) heterogeneous acceleration card, or another type of heterogeneous acceleration card. Taking an FPGA heterogeneous acceleration card as an example, in each FPGA heterogeneous acceleration card, a lookup table logic module is provided in an FPGA logical function, and is realized by a Ram or a register resource of the FPGA. After the system is powered on, the lookup table is configured once by a host end system software, and the information configured is PCIE information (for example, standard bus numbers, device numbers and function numbers) of all heterogeneous acceleration cards in the system, and corresponding customized card ID information.

Step S12: a target data packet is generated, by the first target heterogeneous acceleration card, according to a predefined data packet format, and the target data packet is sent to the second target heterogeneous acceleration card via a PCIE interface.

Figure 2:
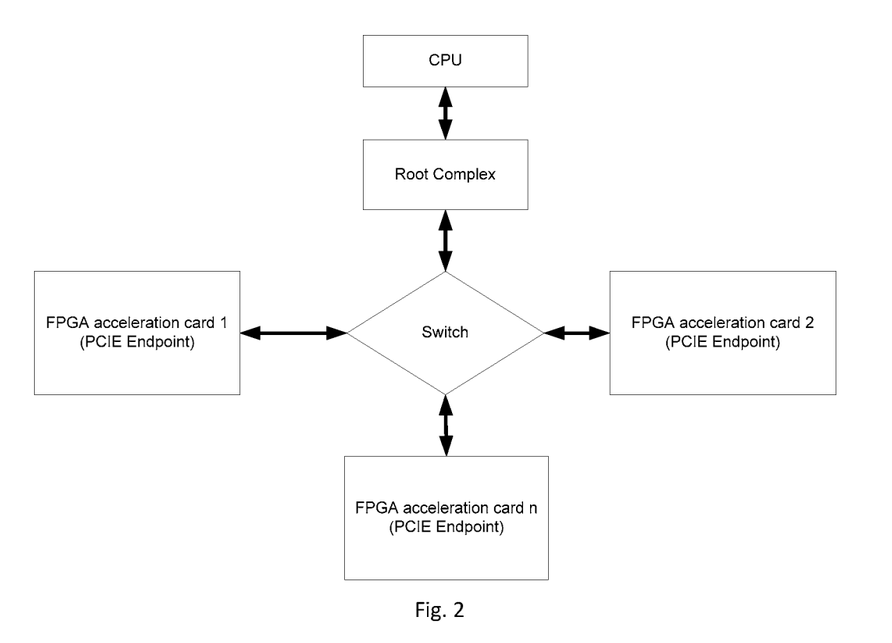
FIG. 2 is a flowchart of a specific communication method for a distributed heterogeneous acceleration platform according to one or more embodiments.

In this embodiment, a target data packet is generated, by the first target heterogeneous acceleration card, according to a predefined data packet format, and the target data packet is sent to the second target heterogeneous acceleration card via a PCIE interface. It can be understood that, for example, as shown in FIG. 2, taking an FPGA heterogeneous acceleration card as an example, in a PCIE system, FPGA heterogeneous acceleration cards 1, . . . , n are mounted on a PCIE Switch by means of PCIE interfaces thereof, and the PCIE Switch is a relay switching part in the PCIE system. The PCIE logic supports peer-to-peer communication, and the PCIE Switch also supports peer-to-peer communication, i.e. supports communication between the FPGA acceleration card 1 and other FPGA acceleration cards.

In this embodiment, the step that a target data packet is generated according to a predefined data packet format may comprise: packetizing is performed according to a processing layer data packet format of PCIE, and payload fields in the processing layer data packet format are filled according to the predefined data packet format to configure a source ID field, a target ID field, an operation type field, an operation address field, a data size field and a data field, so as to obtain the target data packet; wherein the source ID field is used for storing a unique identification number of the first target heterogeneous acceleration card, the target ID field is used for storing a unique identification number of the second target heterogeneous acceleration card, and the operation type comprises a read operation and a write operation.

It can be understood that the PCIE system is divided into a transport layer, a link layer and a physical layer. The standard data packet format of the transport layer is: HEADER, PAYLOAD and ECRC; wherein HEADER is a data header of PCIE, PAYLOAD (payload field) indicates data transmitted by PCIE, which is 0-4096 bytes, and ECRC is a check bit. In this embodiment, the position of PAYLOAD is used to customize the data packet format used for communication, in an embodiment comprising Source ID, Destination ID, W/R, ADDR, LENGTH and DATA PAYLOAD; wherein Source ID (i.e. the source ID field) and Destination ID (i.e. the destination ID field) are the ID number of the FPGA acceleration card (master) initiating an operation and the ID number of the operated FPGA acceleration card (slave), for example, if the FPGA acceleration card 1 initiates a write operation to the FPGA acceleration card 2, the ID of the FPGA acceleration card 1 is source ID, and the ID of the FPGA acceleration card 2 is referred to as Destination ID; W/R (i.e. the operation type field) is a read/write operation bit, for example, 1 indicates a write operation, and 0 indicates a read operation; ADDR (i.e. the operation address field) is an address for a read/write operation, indicating that data reading/writing starts from that address; LENGTH (i.e. the data size field) is the size of data that is read/written in unit of bytes; and DATA PAYLOAD (i.e. the data field) is data of a read/write operation.

Step S13: the target data packet is parsed, by the second target heterogeneous acceleration card, according to the data packet format, and a corresponding read operation or write operation is executed according to a parsing result, so as to complete the collaborative acceleration task.

That is, after receiving the target data packet, the second target heterogeneous acceleration card parses the target data packet according to the data packet format at the time of encapsulating, and then executes a corresponding read operation or write operation according to a parsing result, so as to complete the collaborative acceleration task.

In this embodiment, the step that the target data packet is parsed according to the data packet format, and a corresponding read operation or write operation is executed according to a parsing result may comprise: the payload fields of the target data packet are parsed according to the data packet format; it is determined whether parameter information stored in the target ID field in the payload fields is consistent with a local unique identification number; if so, an operation type corresponding to the operation type field in the payload fields is determined; and according to the operation address field, the data size field and the data field in the payload fields, a corresponding operation is executed according to an operation mode corresponding to the operation type.

In an embodiment, the payload fields of the target data packet are parsed according to the data packet format; when it is determined that parameter information stored in the target ID field in the payload fields is consistent with a local unique identification number, an operation type corresponding to the operation type field in the payload fields is determined on the basis of the determination result; and according to the operation address field, the data size field and the data field in the payload fields, a corresponding operation is executed according to an operation mode corresponding to the operation type.

In this embodiment, the step that according to the operation address field, the data size field and the data field in the payload fields, a corresponding operation is executed according to an operation mode corresponding to the operation type may comprise: when the operation type is a write operation, a first starting address of write is determined according to the operation address field, a first data length is determined according to the data size field, and then the content contained in the data field is written locally according to the first starting address and the first data length; and when the operation type is a read operation, a second starting address of read is determined according to the operation address field, a second data length is determined according to the data size field, then locally corresponding data is read according to the second starting address and the second data length to generate a processing layer data packet, and the processing layer data packet is sent to the first target heterogeneous acceleration card.

In an embodiment, when it is determined that the operation type is a write operation, a first starting address of write is determined on the basis of the determination result according to the operation address field, a first data length is determined according to the data size field, and then the content contained in the data field is written locally according to the first starting address and the first data length; and when it is determined that the operation type is a read operation, a second starting address of read is determined on the basis of the determination result according to the operation address field, a second data length is determined according to the data size field, then locally corresponding data is read according to the second starting address and the second data length to generate a processing layer data packet, and the processing layer data packet is sent to the first target heterogeneous acceleration card.

For example, the FPGA card 1 in the platform initiates a read/write operation to the FPGA card 2, the FPGA card 1 is referred to as a master end, and the FPGA card 2 is referred to as a slave end. The master end first finds, from an information table, ID information of the FPGA card 2 needing to be operated and PCIE information (BDF information) of the FPGA card 2 in a PCIE system; the master end performs packetizing according to standard PCIE TLP in which the PAYLOAD field is filled with customized information, and initiates PCIE TLP transmission to the FPGA card 2; after receiving the TLP data packet sent by the FPGA card 1, the FPGA card 2 first parses the data according to the customized data format (PAYLOAD field), checks whether Destination ID information is ID information of the FPGA card 2, and if so, receives the TLP data packet, otherwise does not make any response. If the FPGA card 1 initiates a write operation to the FPGA card 2, the FPGA card 2 receives data written by the FPGA card 1, and the data is written into the FPGA card 2 according to the starting address and data length information; if the FPGA card 1 initiates a read operation to the FPGA card 2, the FPGA card 2 needs to read data from the FPGA card 2 according to the transmitted starting address and data length, and then packetizes the data into a TLP data packet, and the FPGA card 2, as a master end, sends the TLP data packet back to the FPGA card 1, thereby completing the data read/write operation between the FPGA cards.

It can be seen from the above that, in the embodiments, after starting a collaborative acceleration task, a second target heterogeneous acceleration card is determined, by means of a first target heterogeneous acceleration card in a distributed heterogeneous acceleration platform, from the distributed heterogeneous acceleration platform by querying an information table corresponding to the collaborative acceleration task; a target data packet is generated, by means of the first target heterogeneous acceleration card, according to a predefined data packet format, and the target data packet is sent to the second target heterogeneous acceleration card via a PCIE interface; and the target data packet is parsed, by means of the second target heterogeneous acceleration card, according to the data packet format, and a corresponding read operation or write operation is executed according to a parsing result, so as to complete the collaborative acceleration task. It can be seen from the above that, in this embodiment, by means of a pre-configured information table corresponding to a collaborative acceleration task, a first target heterogeneous acceleration card, as a data sending end, determines a second target heterogeneous acceleration card according to the information table, generates a target data packet according to a predefined data packet format, and then sends the target data packet to the second target heterogeneous acceleration card via a PCIE interface, and the second target heterogeneous acceleration card parses the target data packet according to the data packet format and then executes a corresponding operation. In this way, on the basis of the characteristics that both the first target heterogeneous acceleration card and the second target heterogeneous acceleration card comprise PCIE interfaces, encapsulating and decapsulating are performed according to a preset data packet format; on the basis that PCIE interfaces have the features of large bandwidth, small data transmission delay, and high data transmission privacy and reliability, a read/write operation is actively initiated between heterogeneous acceleration cards merely according to the information table without CPU intervention; and customized data packet formats are designed, thereby realizing autonomous data communication between multiple heterogeneous acceleration cards in a system, implementing a distributed heterogeneous acceleration computing task, allowing for division of work by multiple heterogeneous acceleration cards so as to implement a heterogeneous acceleration task jointly.

Figure 3:
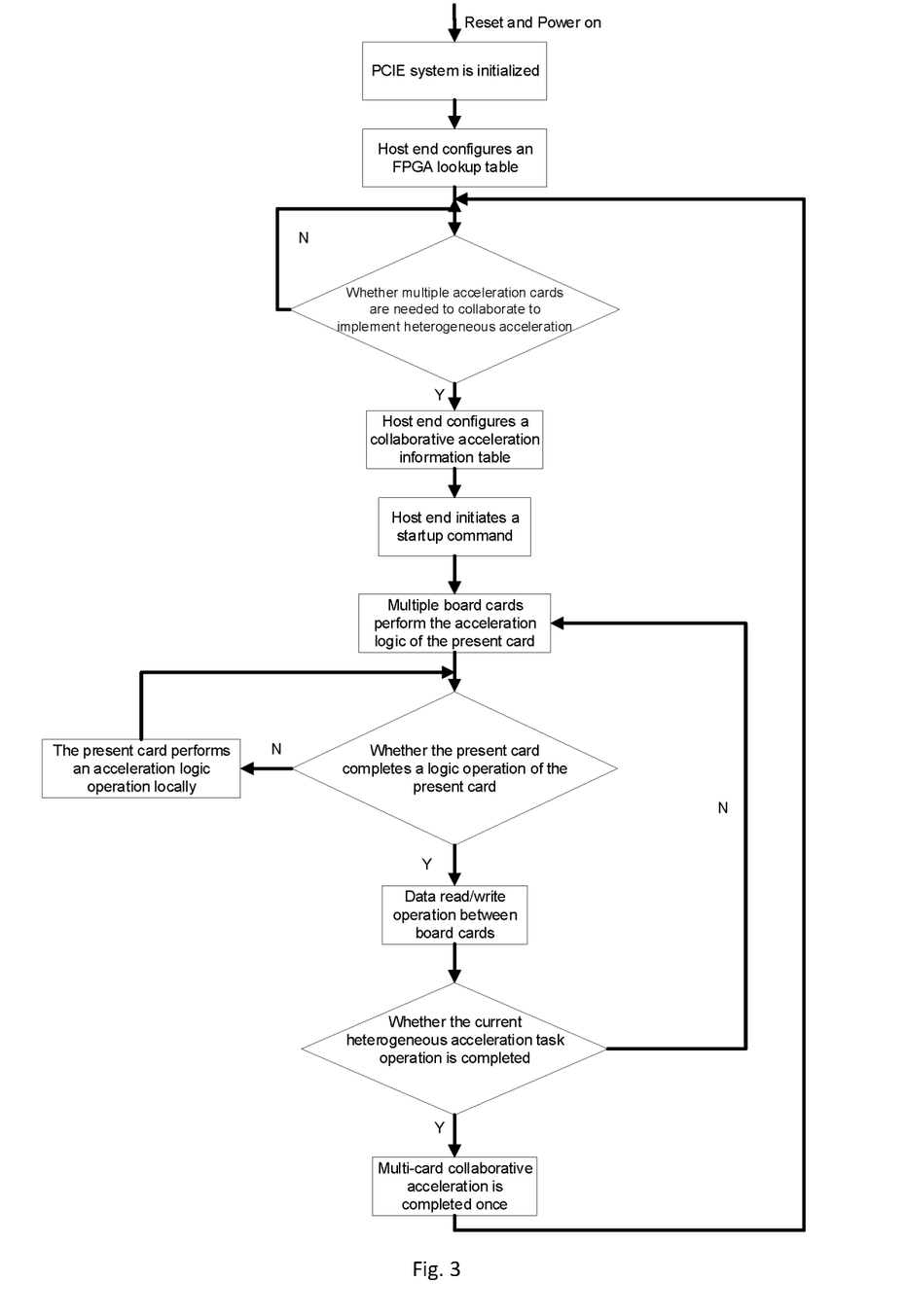
FIG. 3 is a flowchart of a specific communication method for a distributed heterogeneous acceleration platform according to one or more embodiments.

For example, FIG. 3 shows a specific communication flow for a distributed heterogeneous acceleration platform disclosed in the embodiments of the present disclosure, which may comprise the following steps:

Step (1): reset and power on, wherein a PCIE system is initialized, and the PCIE system allocates BFD information to each PCIE end (a FPGA acceleration card serves as an endpoint). Proceed to (2).

Step (2): A host end software configures a board card lookup table once, and configures ID information of a FPGA acceleration card in the system and the BFD information in PCIE into a lookup table module of each FPGA acceleration card. Proceed to step (3).

Step (3): It is determined whether multiple acceleration cards are needed to collaborate to implement the same heterogeneous acceleration task. If not, wait at step (3), and if so, proceed to step (4).

Step (4): The host end configures a collaborative acceleration information table. Proceed to step (5).

Step (5): The host end initiates a collaborative acceleration task startup command. Proceed to step (6).

Step (6): Multiple cards perform the acceleration logic of the present card. Proceed to step (7).

Step (7): It is determined whether the present card completes a local acceleration logic operation. If so, then proceed to step (8), and if not, then proceed to step (9).

Step (8): A data read/write operation is performed between multiple board cards. Proceed to step (10).

Step (9): The present card performs the acceleration logic operation locally. Continue to check step (7).

Step (10): It is determined whether the current collaborative heterogeneous acceleration task operation is completed. If so, then proceed to step (11), and if not, then proceed to step (6).

Step (11): A multi-card collaborative heterogeneous acceleration task is completed once. Proceed to (3).

It can be seen that, by using a PCIE interface on an existing heterogeneous acceleration card and on the basis of a common PCIE switch chip technology in an AI server, data transmission between different acceleration cards is implemented by using a customized data packet format, thereby realizing a distributed multi-board collaborative solution in a heterogeneous acceleration platform. The present disclosure satisfies the practical requirements in the fields such as artificial intelligence or high-performance heterogeneous acceleration computing, while not increasing the system layout and structure, thus having very valuable practical significance.

Figure 4:
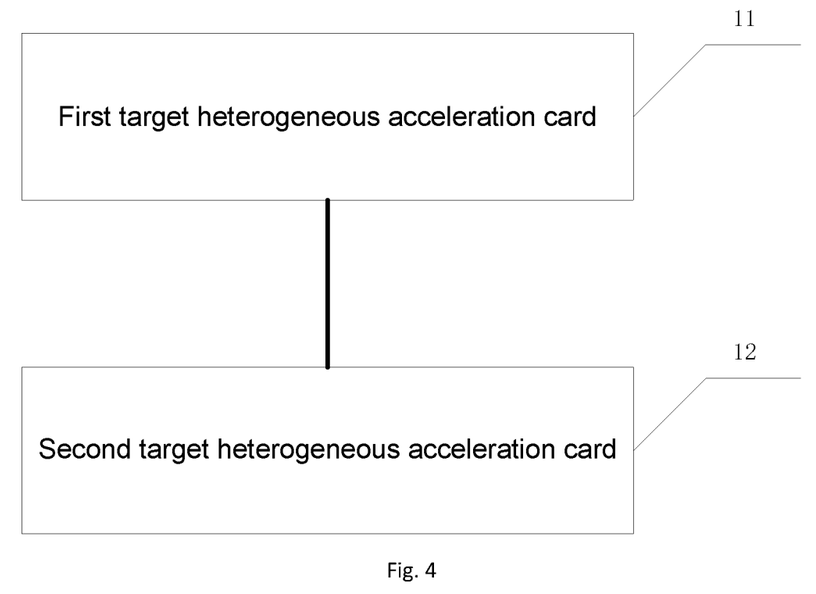
FIG. 4 is a schematic structural diagram of a communication system for a distributed heterogeneous acceleration platform according to one or more embodiments.

Correspondingly, further provided in the embodiments of the present disclosure is a communication system for a distributed heterogeneous acceleration platform. As shown in FIG. 4, the system includes:

a first target heterogeneous acceleration card 11, configured to determine a second target heterogeneous acceleration card from a distributed heterogeneous acceleration platform by querying an information table corresponding to a collaborative acceleration task after starting the collaborative acceleration task, generate a target data packet according to a predefined data packet format, and send the target data packet to the second target heterogeneous acceleration card via a PCIE interface; and the second target heterogeneous acceleration card 12, configured to parse the target data packet according to the data packet format, and execute a corresponding read operation or write operation according to a parsing result, so as to complete the collaborative acceleration task.

It can be seen from the above that, in this embodiment, after starting a collaborative acceleration task, a second target heterogeneous acceleration card is determined, by means of a first target heterogeneous acceleration card in a distributed heterogeneous acceleration platform, from the distributed heterogeneous acceleration platform by querying an information table corresponding to the collaborative acceleration task; a target data packet is generated, by means of the first target heterogeneous acceleration card, according to a predefined data packet format, and the target data packet is sent to the second target heterogeneous acceleration card via a PCIE interface; and the target data packet is parsed, by means of the second target heterogeneous acceleration card, according to the data packet format, and a corresponding read operation or write operation is executed according to a parsing result, so as to complete the collaborative acceleration task. It can be seen from the above that, in this embodiment, by means of a pre-configured information table corresponding to a collaborative acceleration task, a first target heterogeneous acceleration card, as a data sending end, determines a second target heterogeneous acceleration card according to the information table, generates a target data packet according to a predefined data packet format, and then sends the target data packet to the second target heterogeneous acceleration card via a PCIE interface, and the second target heterogeneous acceleration card parses the target data packet according to the data packet format and then executes a corresponding operation. In this way, on the basis of the characteristics that both the first target heterogeneous acceleration card and the second target heterogeneous acceleration card comprise PCIE interfaces, encapsulating and decapsulating are performed according to a preset data packet format; on the basis that PCIE interfaces have the features of large bandwidth, small data transmission delay, and high data transmission privacy and reliability, a read/write operation is actively initiated between heterogeneous acceleration cards merely according to the information table without CPU intervention; and customized data packet formats are designed, thereby realizing autonomous data communication between multiple heterogeneous acceleration cards in a system, implementing a distributed heterogeneous acceleration computing task, allowing for division of work by multiple heterogeneous acceleration cards so as to implement a heterogeneous acceleration task jointly.

In some embodiments, the communication system for a distributed heterogeneous acceleration platform may further comprise:

an information table configuration unit, configured to configure a respective information table for each heterogeneous acceleration card in the distributed heterogeneous acceleration platform according to task information corresponding to the collaborative acceleration task, wherein the information table includes a board card lookup table and a collaborative acceleration parameter table; and after the information table is configured, initiate a collaborative acceleration task startup command to the distributed heterogeneous acceleration platform.

In some embodiments, the information table configuration unit may further comprise:

an identity information acquisition unit, configured to acquire identity information allocated by a PCIE system to each heterogeneous acceleration card, wherein the identity information comprises a bus number, a device number and a function number;

a unique identification number generation unit, configured to set a unique identification number for each heterogeneous acceleration card in the distributed heterogeneous acceleration platform, and obtain parameter information corresponding to each heterogeneous acceleration card on the basis of the identity information and the unique identification number; and a board card lookup table configuration unit, configured to configure the board card lookup table for each heterogeneous acceleration card on the basis of the parameter information corresponding to all heterogeneous acceleration cards.

In some embodiments, the information table configuration unit may further comprise:

a collaborative acceleration information table configuration unit, configured to configure a corresponding collaborative acceleration information table for the heterogeneous acceleration card according to task information corresponding to the collaborative acceleration task, wherein the collaborative acceleration information table comprises participation information corresponding to the current collaborative acceleration task, startup information and a unique identification number of an associated heterogeneous acceleration card.

In some embodiments, the first target heterogeneous acceleration card 11 may be further specifically configured to perform packetizing according to a processing layer data packet format of PCIE, and fill payload fields in the processing layer data packet format according to the predefined data packet format to configure a source ID field, a target ID field, an operation type field, an operation address field, a data size field and a data field, so as to obtain the target data packet; wherein the source ID field is used for storing a unique identification number of the first target heterogeneous acceleration card, the target ID field is used for storing a unique identification number of the second target heterogeneous acceleration card, and the operation type comprises a read operation and a write operation.

In some embodiments, the second target heterogeneous acceleration card 12 may be further specifically configured to parse the payload fields of the target packet according to the data packet format; determine whether parameter information stored in the target ID field in the payload fields is consistent with a local unique identification number; if so, determine an operation type corresponding to the operation type field in the payload fields; and according to the operation address field, the data size field and the data field in the payload fields, execute a corresponding operation according to an operation mode corresponding to the operation type.

In some embodiments, the second target heterogeneous acceleration card 12 may be further specifically configured to, when the operation type is a write operation, determine a first starting address of write according to the operation address field, determine a first data length according to the data size field, and then write the content contained in the data field locally according to the first starting address and the first data length; and configured to, when the operation type is a read operation, determine a second starting address of read according to the operation address field, determine a second data length according to the data size field, then read locally corresponding data according to the second starting address and the second data length to generate a processing layer data packet, and send the processing layer data packet to the first target heterogeneous acceleration card.

Figure 5:
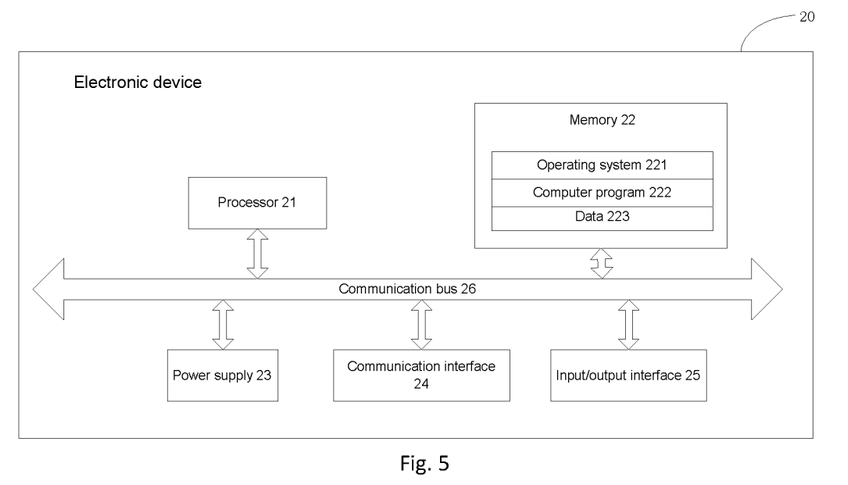
FIG. 5 is a structural diagram of a computer device according to one or more embodiments.

Further, further provided in the embodiments of the present disclosure is a computer device. As shown in FIG. 5, the content in the figure cannot be considered as any limitation to the application scope of the present disclosure.

FIG. 5 is a schematic structural diagram of a computer device 20 according to an embodiment of the present disclosure. The computer device 20 may specifically include a memory 22 and one or more processors 21, wherein the memory 22 stores computer readable instructions which, when executed by the processors, cause the one or more processors 21 to execute the steps of the communication method for a distributed heterogeneous acceleration platform according to any one of the described embodiments.

In this embodiment, a power supply 23 is configured to provide an operating voltage for each hardware device on the computer device 20; a communication interface 24 can create a data transmission channel between the computer device 20 and an external device, and a communication protocol followed thereby is any communication protocol that can be applied to the technical solution of the present disclosure, which is not specifically limited herein; and an input/output interface 25 is configured to acquire external input data or to output data externally, and the specific interface type thereof can be selected according to specific application requirements, which is not specifically limited herein.

In addition, the memory 22, as a carrier for resource storage, may be a read-only memory, a random access memory, a magnetic disk or an optical disk, etc., resources stored thereon comprise an operating system 221, a computer program 222, data 223 comprising an information table, etc., and the storage manner may be temporary storage or permanent storage.

The operating system 221 is configured to manage and control various hardware devices on the computer device 20 and the computer program 222, so as to allow for operation and processing of mass data 223 in the memory 22 by the processor 21. The operating system 221 may be Windows Server, Netware, Unix, Linux, etc. The computer program 222 may further comprise a computer program that can be used to accomplish other specific tasks in addition to the computer program that can be used to accomplish the communication method for a distributed heterogeneous acceleration platform performed by the computer device 20 as disclosed in any of the described embodiments.

Further, the embodiments of the present disclosure further provide one or more non-volatile storage media storing computer readable instructions which, when executed by one or more processors, cause the one or more processors to execute the steps of the communication method for a distributed heterogeneous acceleration platform according to any one of the described embodiments.

The embodiments in this description are described in a progressive manner. Each embodiment focuses on a part different from other embodiments. For the same or similar parts among the embodiments, reference may be made to each other. As the system disclosed in the embodiments corresponds to the method disclosed in the embodiments, the description of the system is relatively simple, and for the related parts, reference can be made to the description of the method.

The steps of a method or algorithm described in connection with the embodiments disclosed herein may be implemented directly by hardware, by a software module executed by a processor, or by a combination of the two. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

Finally, it should be noted that, in this description, relationship terms such as first and second are merely used to distinguish one entity or operation from another entity or operation, and do not necessarily require or imply any actual relationship or sequence between these entities or operations. Furthermore, the terms "comprise" and "contain", or any other variant thereof are intended to cover a non-exclusive inclusion, so that a process, a method, an article, or a device that comprises a series of elements not only comprises those elements, but also comprises other elements that are not explicitly listed, or further comprises elements inherent to the process, the method, the article, or the device. Without more limitations, an element limited by "comprise a . . . " does not exclude other same elements also existing in a process, a method, an article, or a device that comprises the element.

The foregoing describes in detail a communication method and system for a distributed heterogeneous acceleration platform, a device and a medium provided in the present disclosure. Specific examples are used therein to describe principles and implementations of the present disclosure. The description of the described embodiments is merely used to help understand the method and core idea of the present disclosure. Meanwhile, a person of ordinary skill in the art may make modifications to the specific implementations and application scopes according to the idea of the present disclosure. In conclusion, the content of the description shall not be construed as a limitation to the present disclosure.

What is claimed is:

1. A communication method for a distributed heterogeneous acceleration platform, comprising:
   after starting a collaborative acceleration task, determining, by a first target heterogeneous acceleration card in a distributed heterogeneous acceleration platform, a second target heterogeneous acceleration card from the distributed heterogeneous acceleration platform by querying an information table corresponding to the collaborative acceleration task;
   generating, by the first target heterogeneous acceleration card, a target data packet according to a predefined data packet format, and sending the target data packet to the second target heterogeneous acceleration card via a PCIE interface; and
   parsing, by the second target heterogeneous acceleration card, the target data packet according to the data packet format, and executing a corresponding read operation or write operation according to a parsing result, so as to complete the collaborative acceleration task.

2. The communication method for a distributed heterogeneous acceleration platform according to claim 1, wherein before determining, by the first target heterogeneous acceleration card in a distributed heterogeneous acceleration platform, a second target heterogeneous acceleration card from the distributed heterogeneous acceleration platform by querying an information table corresponding to the collaborative acceleration task, the method further comprises:

configuring a respective information table for each heterogeneous acceleration card in the distributed heterogeneous acceleration platform according to task information corresponding to the collaborative acceleration task, wherein the information table comprises a board card lookup table and a collaborative acceleration parameter table; and after the information table is configured, initiating a collaborative acceleration task startup command to the distributed heterogeneous acceleration platform.

3. The communication method for a distributed heterogeneous acceleration platform according to claim 2, wherein configuring a board card lookup table for each heterogeneous acceleration card in the distributed heterogeneous acceleration platform comprises:

acquiring identity information allocated by a PCIE system to each heterogeneous acceleration card, wherein the identity information comprises a bus number, a device number and a function number;

setting a unique identification number for each heterogeneous acceleration card in the distributed heterogeneous acceleration platform, and obtaining parameter information corresponding to each heterogeneous acceleration card on the basis of the identity information and the unique identification number; and configuring the board card lookup table for each heterogeneous acceleration card on the basis of the parameter information corresponding to all heterogeneous acceleration cards.

4. The communication method for a distributed heterogeneous acceleration platform according to claim 3, wherein configuring a collaborative acceleration parameter table for each heterogeneous acceleration card in the distributed heterogeneous acceleration platform comprises:

configuring a corresponding collaborative acceleration information table for each heterogeneous acceleration card according to task information corresponding to the collaborative acceleration task, wherein the collaborative acceleration information table comprises participation information corresponding to the current collaborative acceleration task, startup information and a unique identification number of an associated heterogeneous acceleration card.

5. The communication method for a distributed heterogeneous acceleration platform according to claim 1, wherein generating a target data packet according to a predefined data packet format comprises:

performing packaging according to a processing layer data packet format of PCIE, and filling payload fields in the processing layer data packet format according to the predefined data packet format to configure a source ID field, a target ID field, an operation type field, an operation address field, a data size field and a data field, so as to obtain the target data packet;

wherein the source ID field is used for storing a unique identification number of the first target heterogeneous acceleration card, the target ID field is used for storing a unique identification number of the second target heterogeneous acceleration card, and the operation type comprises a read operation and a write operation.

6. The communication method for a distributed heterogeneous acceleration platform according to claim 5, wherein parsing the target data packet according to the data packet format, and executing a corresponding read operation or write operation according to a parsing result comprise:

parsing the payload fields of the target data packet according to the data packet format;

when parameter information stored in the target ID field in the payload fields is consistent with a local unique identification number, determining an operation type corresponding to the operation type field in the payload fields; and according to the operation address field, the data size field and the data field in the payload fields, executing a corresponding operation according to an operation mode corresponding to the operation type.

7. The communication method for a distributed heterogeneous acceleration platform according to claim 6, wherein according to the operation address field, the data size field and the data field in the payload fields, executing a corresponding operation according to an operation mode corresponding to the operation type comprises:

when the operation type is a write operation, determining a first starting address of write according to the operation address field, determining a first data length according to the data size field, and then locally writing the content contained in the data field according to the first starting address and the first data length; and when the operation type is a read operation, determining a second starting address of read according to the operation address field, determining a second data length according to the data size field, then reading locally corresponding data according to the second starting address and the second data length to generate a processing layer data packet, and sending the processing layer data packet to the first target heterogeneous acceleration card.

8. A communication system for a distributed heterogeneous acceleration platform, comprising:

a first target heterogeneous acceleration card, configured to determine a second target heterogeneous acceleration card from a distributed heterogeneous acceleration platform by querying an information table corresponding to a collaborative acceleration task after starting the collaborative acceleration task, generate a target data packet according to a predefined data packet format, and send the target data packet to the second target heterogeneous acceleration card via a PCIE interface; and the second target heterogeneous acceleration card, configured to parse the target data packet according to the data packet format, and execute a corresponding read operation or write operation according to a parsing result, so as to complete the collaborative acceleration task.

9. A computer device, comprising a memory and one or more processors, wherein the memory stores computer readable instructions which, when executed by the one or more processors, cause the one or more processors to:

after starting a collaborative acceleration task, determine, by a first target heterogeneous acceleration card in a distributed heterogeneous acceleration platform, a second target heterogeneous acceleration card from the distributed heterogeneous acceleration platform by querying an information table corresponding to the collaborative acceleration task;

generate, by the first target heterogeneous acceleration card, a target data packet according to a predefined data packet format, and sending the target data packet to the second target heterogeneous acceleration card via a PCIE interface; and parse, by the second target heterogeneous acceleration card, the target data packet according to the data packet format, and executing a corresponding read operation or write operation according to a parsing result, so as to complete the collaborative acceleration task.

10. A non-transitory computer readable storage media storing computer readable instructions which, when executed by one or more processors, cause the one or more processors to execute the steps of the method as claimed in claim 1.

11. The communication method for a distributed heterogeneous acceleration platform according to claim 1, wherein the information table is pre-stored in the first target heterogeneous acceleration card, or is pre-stored in a public database for all heterogeneous acceleration cards in the distributed heterogeneous acceleration platform.

12. The communication method for a distributed heterogeneous acceleration platform according to claim 1, wherein the participation information indicate whether the present card needs to participate in the current collaborative heterogeneous acceleration.

13. The communication method for a distributed heterogeneous acceleration platform according to claim 1, wherein the startup information indicate that the current collaborative acceleration operation of the present card is started.

14. The communication method for a distributed heterogeneous acceleration platform according to claim 1, wherein the ID information is a unique identification number of an associated heterogeneous acceleration card, and indicate that a local acceleration operation result of the present card needs to be transferred to a next heterogeneous acceleration card, and a subsequent heterogeneous acceleration action is continuously performed.

15. The communication method for a distributed heterogeneous acceleration platform according to claim 1, wherein the heterogeneous acceleration card is an FPGA heterogeneous acceleration card, or a graphics processing unit (GPU) heterogeneous acceleration card.

16. The computer device according to claim 9, the one or more processors is further caused to:
configure a respective information table for each heterogeneous acceleration card in the distributed heterogeneous acceleration platform according to task information corresponding to the collaborative acceleration task, wherein the information table comprises a board card lookup table and a collaborative acceleration parameter table; and
after the information table is configured, initiate a collaborative acceleration task startup command to the distributed heterogeneous acceleration platform.

17. The computer device according to claim 16, the one or more processors is further caused to:
acquire identity information allocated by a PCIE system to each heterogeneous acceleration card, wherein the identity information comprises a bus number, a device number and a function number;
set a unique identification number for each heterogeneous acceleration card in the distributed heterogeneous acceleration platform, and obtain parameter information corresponding to each heterogeneous acceleration card on the basis of the identity information and the unique identification number; and
configure the board card lookup table for each heterogeneous acceleration card on the basis of the parameter information corresponding to all heterogeneous acceleration cards.

18. The computer device according to claim 17, the one or more processors is further caused to:
configure a corresponding collaborative acceleration information table for each heterogeneous acceleration card according to task information corresponding to the collaborative acceleration task, wherein the collaborative acceleration information table comprises participation information corresponding to the current collaborative acceleration task, startup information and a unique identification number of an associated heterogeneous acceleration card.

19. The computer device according to claim 9, the one or more processors is further caused to:
perform packaging according to a processing layer data packet format of PCIE, and fill payload fields in the processing layer data packet format according to the predefined data packet format to configure a source ID field, a target ID field, an operation type field, an operation address field, a data size field and a data field, so as to obtain the target data packet;
wherein the source ID field is used for storing a unique identification number of the first target heterogeneous acceleration card, the target ID field is used for storing a unique identification number of the second target heterogeneous acceleration card, and the operation type comprises a read operation and a write operation.

20. The computer device according to claim 19, the one or more processors is further caused to:
parse the payload fields of the target data packet according to the data packet format;
when parameter information stored in the target ID field in the payload fields is consistent with a local unique identification number, determine an operation type corresponding to the operation type field in the payload fields; and
according to the operation address field, the data size field and the data field in the payload fields, execute a corresponding operation according to an operation mode corresponding to the operation type.

* * * * *